(12) United States Patent
Fukuyo et al.

(10) Patent No.: US 8,038,875 B2
(45) Date of Patent: Oct. 18, 2011

(54) TREATMENT APPARATUS FOR SHIP BALLAST WATER

(75) Inventors: Yasuwo Fukuyo, Tokyo (JP); Takeaki Kikuchi, Tokyo (JP); Jun Waki, Tokyo (JP); Seiji Kino, Saga (JP); Kazunobu Hirao, Hiroshima (JP); Katsumi Yoshida, Tokyo (JP); Syuji Ueki, Tokyo (JP)

(73) Assignee: Mitsui Engineering & Shipbuilding Co., Ltd., Tokyo (JP)

( * ) Notice: Subject to any disclaimer, the term of this patent is extended or adjusted under 35 U.S.C. 154(b) by 0 days.

(21) Appl. No.: 12/443,436

(22) PCT Filed: Sep. 28, 2007

(86) PCT No.: PCT/JP2007/069103
§ 371 (c)(1),
(2), (4) Date: Mar. 27, 2009

(87) PCT Pub. No.: WO2008/038803
PCT Pub. Date: Apr. 3, 2008

(65) Prior Publication Data
US 2010/0006490 A1   Jan. 14, 2010

(30) Foreign Application Priority Data
Sep. 29, 2006 (JP) ................. 2006-269705

(51) Int. Cl.
*C02F 1/78* (2006.01)
*C02F 9/00* (2006.01)
(52) U.S. Cl. .............. 210/137; 210/192; 210/195.1; 210/202; 210/242.1; 210/258; 210/259
(58) Field of Classification Search .............. 210/760, 210/764, 170.09, 170.11, 192, 195.1, 200, 210/201, 202, 242.1, 931, 748.01–748.19, 210/750, 130, 137, 70.09; 114/125; 261/DIG. 42; 422/113, 224, 226; 366/174.1, 176.1, 340
See application file for complete search history.

(56) References Cited

U.S. PATENT DOCUMENTS
3,565,404 A * 2/1971 Reid et al. .............. 366/137
(Continued)

FOREIGN PATENT DOCUMENTS
JP   2003200156 A   7/2003
JP   2004160437 A   6/2004
JP   2005088835 A   4/2005

OTHER PUBLICATIONS
Merriam-Webster online definition for "dissolve" (obtained Feb. 2010).*

(Continued)

*Primary Examiner* — Nam Nguyen
*Assistant Examiner* — Lucas Stelling
(74) *Attorney, Agent, or Firm* — K. David Crockett, Esq.; Niky Economy Syrengelas, Esq.; Crockett & Crockett, PC

(57) ABSTRACT

A practical treatment apparatus for ship ballast water, which can kill aquatic organisms contained in the ballast water, is provided by being easily incorporated in an existing ballast-water system piping in a ship. In a branch pipe 131 branched from the existing ballast-water system piping for taking in the ballast water into the ship by a first ballast pump 4 with high flow-rate/low pressure and transferring it to a ballast tank 2, an ozone mixing device for mixing ozone generated by an ozone generator, a second ballast pump 134 for discharging said ballast water with lower flow-rate/high pressure than those of said first ballast pump, a slit plate 135 provided on the secondary side of said second ballast pump 134 and having a plurality of slit-shaped openings for passing said ballast water, and a deaeration tank 136 for deaerating undissolved ozone from the ballast water are provided, and the apparatus is configured so that the ballast water after deaeration discharged from said deaeration tank 136 is returned to said ballast-water system piping.

4 Claims, 5 Drawing Sheets

U.S. PATENT DOCUMENTS

| | | | | |
|---|---|---|---|---|
| 4,623,467 A * | 11/1986 | Hamlin | ............... | 210/259 |
| 5,968,352 A * | 10/1999 | Ditzler | ............... | 210/205 |
| 6,773,607 B2 * | 8/2004 | Russell | ............... | 210/764 |
| 2003/0015481 A1 * | 1/2003 | Eidem | ............... | 210/760 |
| 2003/0196967 A1 * | 10/2003 | Robinson et al. | ............... | 210/760 |

OTHER PUBLICATIONS

English language machine translation of 2003-200156.*

Oemcke, "THe treatment of Ships' Ballast Water." EcoPorts Monograph Series No. Mar. 18, 1999.*

Kikuchi, Takeaki, "Ship ballast water management treaty and ballast water treating system." Cargo Handling Japan, vol. 51. No. 2. pp. 235-240 (Mar. 2006).*

Kikuchi, T., "Ship ballast water management treaty and ballast water treating systems" (aka "International Convention for the Control and Management of Ship's Ballast water and Sediments and Systems for Treating Ship Ballast water") Cargo Hadling Japan. vol. 51. No. 2., Mar. 2006. (English language translation).*

Machine translation of JP 2005-088835 to Yuya (obtained from JPO Jul. 2010).*

* cited by examiner

TREATMENT APPARATUS FOR SHIP BALLAST WATER

TECHNICAL FIELD

The present invention relates to a treatment apparatus for ship ballast water and more particularly to a treatment apparatus for ship ballast water that can kill aquatic organisms contained in ballast water by being easily incorporated in an existing ballast water system piping in a ship.

BACKGROUND ART

In a cargo ship transporting crude oil, containers and the like, a ballast tank is provided in order to maintain stability of a hull during navigation. Usually, if crude oil and the like are not loaded, the ballast tank is filled with ballast water, and the ballast water is discharged when crude oil, containers and the like are loaded so as to adjust a buoyancy of the hull and stabilize the hull.

As mentioned above, the ballast water is water required for safe navigation of a ship, and seawater at a port where cargo handling is carried out is usually used. Its amount is estimated to be 3 to 4 billion tons on the worldwide basis.

In the ballast water, aquatic organisms living in a port from which the water was taken are mixed, and the aquatic organisms are also transported to foreign countries with movement of the ship.

Therefore, destruction of an ecological system, in that a species foreign to a local sea may replace an indigenous species, is a serious problem.

With such a background, at a diplomatic conference of the International Maritime Organization (IMO), the International Convention for the Control and Management of Ships' Ballast Water and Sediments (hereinafter referred to as the convention) was adopted, and a duty to execute ballast water management using a ballast water treatment apparatus is scheduled to be applied to ships constructed in 2009 and after.

Also, a ballast-water discharge standard is specified by the convention as shown in Table 1 below:

TABLE 1

| Item | | Ballast water quality standard | Size |
|---|---|---|---|
| Aquatic organism | | 10 pieces/ml | 10 to 50 $\mu$m |
| Aquatic organism | | 10 pieces/m$^3$ | 50 $\mu$m or more |
| Indicator bacteria | *Escherichia Coli* | 250 cfu/100 ml | |
| | Pathogenic cholera vibrio (01, 0139) | 1 cfu/100 ml | |
| | *Enterococcus* | 100 cfu/100 ml | |

From the above background, development of a ballast-water treatment technology that can solve the above problems is urgently needed.

In the past, as a method of physically treating water containing aquatic organisms such as plankton, a technology to disinfect or sterilize the aquatic organisms in the ballast water by injecting an ozone gas into the ballast water is disclosed in Patent Document 1.

Also, a technology to mechanically destroy and kill the aquatic organisms by having water containing the aquatic organisms pass a slit plate by a high-pressure pump is disclosed in Patent Document 2.

Currently, in a ship navigating the ocean, a ballast pump for taking in the ballast water and a ballast-water system piping for supplying the ballast water into a ballast tank are provided.

As an existing ballast pump, a high flow-rate/low-pressure pump with a specification of 600 m$^3$/h, 0.25 MPa as an example is used.

The inventors tried to apply the slit plate described in Patent Document 2 to the ballast-water system piping, but it was found out that the existing ballast pump lacks in pressure and the slit plate does not function. Reduction of a treatment water amount can be one solution, but time constraints apply to supply of the ballast water into the ballast tank (such as constraint of time allowed for anchorage, for example), and it is difficult to extremely reduce the treatment water amount.

Also, in the existing ballast pump, pipings and the like for taking in the ballast water and for discharging the ballast water are installed in a complicated manner, and if the treatment water amount is reduced, the diameter of the piping should be also changed, and if the flow rate is to be changed by a valve, it is a difficult work to install the valve in a narrow space, and this solution is costly.

Then, the inventors tried to develop a practical technology to efficiently treat the ballast water with a required minimum remodeling effectively using the existing ballast pump or existing ballast-water system pipings and have realized the present invention.

Patent Document 1: Japanese Patent Laid-Open No. 2004-160437
Patent Document 2: Japanese Patent Laid-Open No. 2003-200156

DISCLOSURE OF INVENTION

Problem to be Solved by the Invention

The present invention has an object to provide a practical treatment apparatus for ship ballast water that can kill aquatic organisms contained in ballast water which can be easily incorporated in an existing ballast-water system piping of a ship is described.

Other objects of the present invention will be made apparent from the descriptions below.

Means for Solving Problem

The above problems are solved by each of the inventions below.

An invention described in claim 1 is a treatment apparatus for ship ballast water, comprising an ozone mixing device at a branch pipe branched from an existing ballast-water system piping for taking in ballast water into a ship by a first ballast pump with high flow-rate/low pressure and transferring it to a ballast tank, for mixing ozone generated by an ozone generator into the ballast water, a second ballast pump discharging the ballast water with lower flow-rate/higher pressure than the first ballast pump, a slit plate provided on a secondary side of the second ballast pump and having a plurality of slit-shaped openings for destroying aquatic organisms in the ballast water by a shearing force by having the ballast water pass, and a deaeration tank for deaerating undissolved ozone from the ballast water in which the ozone is mixed by the ozone mixing device so that the deaerated ballast water discharged from the deaeration tank is returned to the ballast-water system piping.

An invention described in claim 2 is a treatment apparatus for ship ballast water described in claim 1, characterized in that a return pipe is provided from the middle of a piping for flowing ballast water discharged from the deaeration tank into the ballast-water system piping, for returning the ballast water to the primary side of the ozone mixing device for circulation, and a safety valve which is opened when a pressure larger than a predetermined pressure is applied in a line on the secondary side of the slit plate is provided in the return pipe.

An invention described in claim 3 is a treatment apparatus for ship ballast water described in claim 1 or 2, characterized in that a discharged ozone dissolving tower that dissolves the ozone separated from the ballast water by the deaeration tank and discharges it into the air is provided.

An invention described in claim 4 is a treatment apparatus for ship ballast water described in claim 1, 2 or 3, characterized in that a discharge pipe is provided in the ballast-water system piping for discharging the ballast water in the ballast tank and a removing device for removing an oxidant containing bromine oxides in the ballast water with activated carbon is provided in the discharge pipe.

Effect of the Invention

According to the present invention, a practical treatment apparatus for ship ballast water which can kill aquatic organisms contained in ballast water by being easily incorporated in an existing ballast-water system piping of a ship.

EXPLANATIONS OF LETTERS OR NUMERALS

Figure 1:
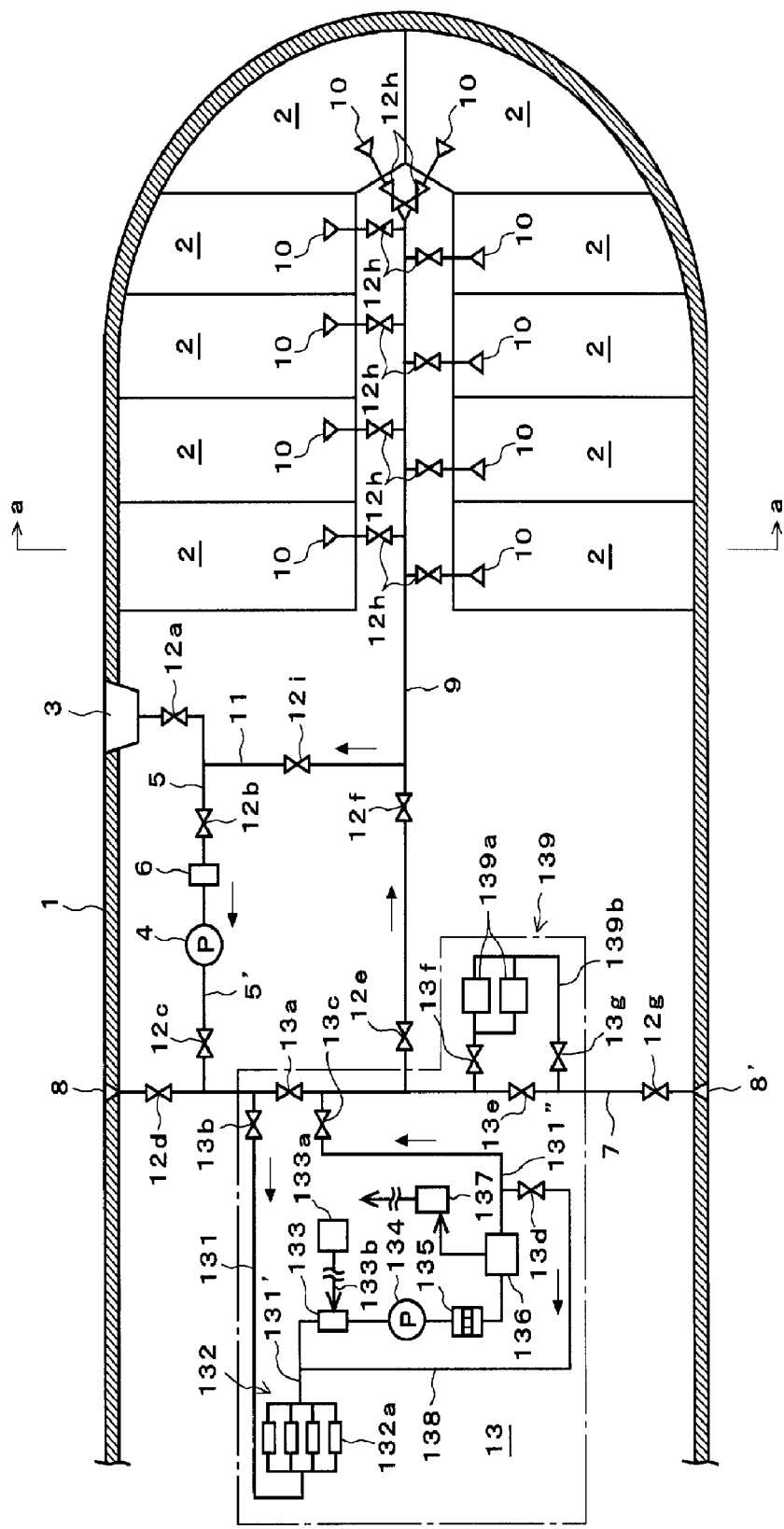
FIG. 1 is a configuration diagram shown on a plan view of an outline of a major portion of a ship in which a treatment apparatus for ship ballast water according to the present invention is provided.

1: hull
2: ballast tank
3: sea chest
4: ballast pump (first ballast pump)
5: intake pipe
6: strainer
7: discharge pipe
8: discharge port
9: major piping
10: water injection/discharge nozzle
11: bypass pipe
12*a* to 12*i*: opening/closing valve
13: treatment apparatus
13*a*, 13*b*, 13*c*, 13*e*: opening/closing valve
13*d*: safety valve
131: branch pipe
132: pre-filter unit
132*a*: filter
133: ozone mixing device
133*a*: ozone generator
133*b*: transfer pipe 134: ballast pump (second ballast pump)
135, 135A, 135B: slit plate
135*a*: slit-shaped opening
136: deaeration tank
137: discharged ozone dissolving tower
138: return pipe
139: removing device
139*a*: activated carbon tank
139*b*: piping
100: cargo room
200: engine room

BEST MODE(S) FOR CARRYING OUT THE INVENTION

An embodiment of the present invention will be described below using the attached drawings.

Figure 2:
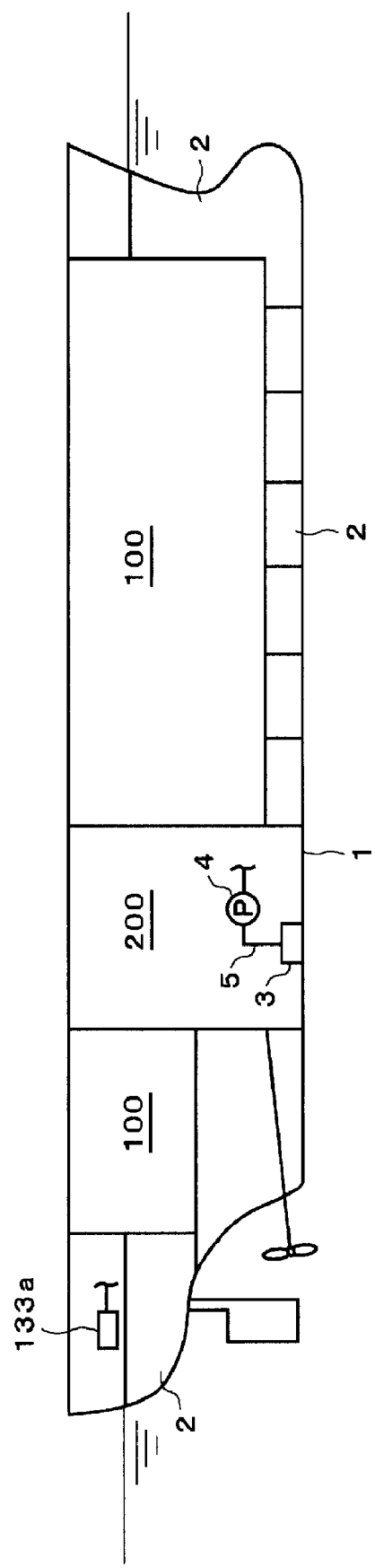
FIG. 2 is a configuration diagram shown on a side view of an outline of a major portion of a ship in which a treatment apparatus for ship ballast water according to the present invention is provided.
Figure 3:
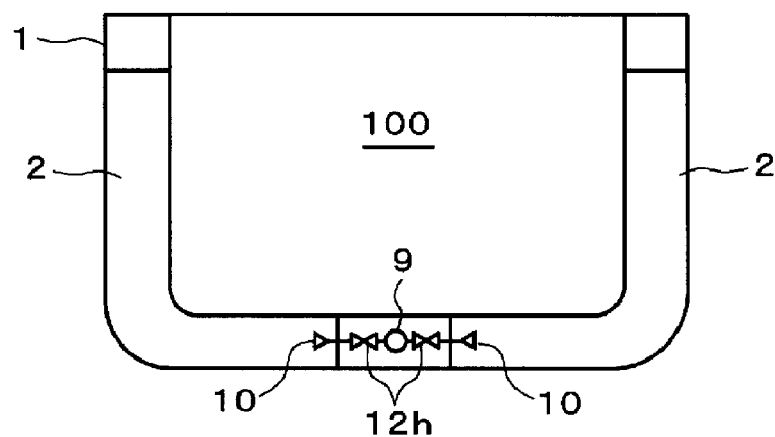
FIG. 3 is a sectional view of a-a line in FIG. 1.

FIG. 1 is a configuration diagram showing on a plan view an outline of a major portion of a ship in which a treatment apparatus for ship ballast water according to the present invention is provided, FIG. 2 is a configuration diagram shown on a side view, and FIG. 3 is a sectional view of a-a line in FIG. 1. Here, a containership on which containers are loaded is exemplified as a ship. In the figure, reference numeral 1 denotes a hull, reference numeral 2 denotes a ballast tank disposed in the vicinity of the bow of the hull 1, reference numeral 100 denotes a cargo room in which the containers are accommodated, and reference numeral 200 denotes an engine room.

Into each ballast tank 2, ballast water (sea water or fresh water) is taken in through a sea chest 3 provided in the vicinity of a ship bottom portion by operation of a ballast pump (first ballast pump) 4. The ballast water contains aquatic organisms such as zooplankton, phytoplankton, bacteria and the like. The ballast pump 4 is provided at an intake pipe 5 for taking the ballast water into the hull 1 through the sea chest 3, and a strainer 6 is interposed on its primary side (front side, suction side of the ballast pump 4).

The strainer 6 is to remove relatively large foreign substances in the ballast water flowing into the ballast pump 4, and a strainer having a hole with a diameter of 5 to 10 mmϕ or preferably 8 mmϕ is opened with a pitch of 5 to 15 mm or preferably of 11 mm, for example, can be used.

Reference numeral 7 is a water discharge pipe disposed to traverse the hull 1 and the both ends are connected to water discharge ports 8, 8' provided at both side portions of the hull 1, respectively. An intake pipe 5' on the secondary side (outlet side, discharge side) of the ballast pump 4 is connected to a middle portion of the water discharge pipe 7.

Reference numeral 9 is a major piping for transferring ballast water, and its one end is connected to the middle portion of the water discharge pipe 7. To the other end, a water injection/discharge nozzle 10 disposed in each ballast tank 2 for water injection and discharge of each ballast tank 2 is connected, respectively.

Reference numeral 11 is a bypass pipe used to discharge the ballast water in each ballast tank 2 to the outside of the hull 1 by operation of the ballast pump 4 and is disposed so as to connect the major piping 9 and the intake pipe 5 on the primary side (inlet side, suction side) of the ballast pump 4.

Components with reference numerals 12*a* to 12*i* are opening/closing valves.

If the ballast water is to be injected into each ballast tank 2 through such a ballast-water system piping, the opening/closing valves 12*a*, 12*b*, 12*c*, 12*e*, 12*f*, 12*h* are opened, while the opening/closing valves 12*d*, 12*g*, 12*i* are closed, respectively, and then, the ballast pump 4 is operated so as to take in the ballast water from the sea chest 3 through the intake pipes 5, 5'. The ballast water flowing into the intake pipe 5 from the sea chest 3 has large trash removed by the strainer 6 and then, flows into the major piping 9 through the water discharge pipe 7. The ballast water flowing into the major piping 9 is injected into each ballast tank 2 through the water injection/discharge nozzle 10 provided in each ballast tank 2.

When the ballast water in each ballast tank 2 is to be discharged, the opening/closing valves 12b, 12c, 12d, 12e, 12f, 12g, 12i are opened, while the opening/closing valves 12a, 12e, 12f are closed this time, and then, the ballast pump 4 is operated so that the ballast water in each ballast tank 2 flows into the water discharge pipe 7 from the water injection/discharge nozzle 10 through the major piping 9, the bypass pipe 11, the intake pipes 5, 5', the strainer 6, and the ballast pump 4 and is discharged to the outside from the discharge ports 8, 8' on the both side portions of the hull 1.

In such an existing ballast-water system piping, a treatment apparatus 13 for ship ballast water according to the present invention is provided.

In the treatment apparatus 13, on a branch pipe 131 branched from the middle portion of the water discharge pipe 7 in the above-described ballast-water system piping, a pre-filter unit 132, an ozone mixing device 133, a ballast pump (second ballast pump) 134, a slit plate 135, and a deaeration tank 136 are provided sequentially.

The branch pipe 131 is branched from the water discharge pipe 7 between the intake pipe 5' and the major piping 9 connected to the water discharge pipe 7, respectively, and the other end is connected to the water discharge pipe 7 between the branch portion and the major piping 9 in order to return the ballast water discharged from the deaeration tank 136 to the water discharge pipe 7 again.

The pre-filter unit 132 is constituted by a plurality of (four are shown in FIG. 1) filters 132a connected in parallel removes the foreign substances taken into the treatment apparatus 13 without being fully removed by the strainer 6 provided in the intake pipe 5 from the ballast water. Particularly, in order not to cause clogging when the ballast water passes the slit-shaped opening of the slit plate 135 provided on the rear stage, a filter finer than the strainer 6 is used as a mesh of each filter 132a, and a filter with a mesh of 200 to 300 μm or preferably 250 μm, for example, is used.

It is preferably configured such that one of the plurality of filters 132a is used as a spare, while the other filters 132a remove the foreign substances from the ballast water, during which the one spare filter 132a is back-washed so as to solve clogging in operation. By periodically alternating the filter 132a to be backwashed as a spare in the plurality of filters 132a, continuous operation without clogging is realized for a long time.

The ozone mixing device 133 mixes ozone generated by the ozone generator 133a in the ballast water having passed the pre-filter unit 132. As the ozone generator 133a, a silent discharge type, an ultraviolet irradiation type and the like can be used, and as shown in FIG. 2, the generator is arranged at the stern in the hull 1 so that the water can be transferred to the ozone mixing device 133 through a transfer pipe 133b by a pump, not shown.

The ozone mixing device 133 shows an example using a gas-liquid mixing device (ozone injector) for gas-liquid mixing of the ballast water transferred through a branch pipe 131' after having passed the pre-filter unit 132 and ozone or a mixed gas of ozone and oxygen, but it is not limiting as long as ozone with a predetermined concentration can be mixed in the ballast water. For example, a static mixing machine such as a static mixer, line mixer and the like can be used. Alternatively, it may be so configured that ozone water in which ozone or a mixed gas of ozone and oxygen is mixed in the ballast water so as to achieve a predetermined concentration is prepared in advance, and ozone with a predetermined concentration is mixed in the ballast water by mixing the ozone water in the ballast water transferred through the branch pipe 131' after having passed the pre-filter unit 132 so as to achieve a predetermined ratio.

By mixing of ozone in the ballast water, the aquatic organisms in the ballast water are killed. The ozone concentration in the ballast water is preferably 5 ppm (g ozone/m$^3$ ballast water) at the maximum in order to exert disinfection effect. If 5 ppm is exceeded, corrosion of the ballast tank 2 and the like by the ozone becomes a concern. The concentration is preferably within a range of 0.5 to 5 ppm.

The ballast water in the branch pipe 131' is transferred by the operation of the ballast pump (second ballast pump) 134.

The existing ballast pump (first ballast pump) 4 provided in the intake pipe 5 is a pump with high flow-rate/low pressure. The existing ballast pump 4 with low pressure is sufficient since it only needs to be able to transfer the ballast water to the ballast tank and there are fewer portions where pressure loss is caused. Also, the flow rate is set high in order to complete transfer of the ballast water in a short time. Specifically, an example of an existing ship has 600 m$^3$/h, 0.25 MPa. In general, a bulk carrier of 40 to 60 thousand ton has a range of 500 to 700 m$^3$/h, 0.2 to 0.3 MPa.

On the other hand, as the second ballast pump 134, a pump with lower flow-rate/higher pressure than those of the first ballast pump 4 is used. The flow rate can be determined by time required to fill the ballast tank with the treated ballast water obtained by the treatment of the present invention such as in a limit of time during which the ship can be anchored in the port, for example, but it is set at a flow rate lower than that of the existing first ballast pump 4. Thereby, a diameter of the branch pipe can be reduced so as to reduce a cost.

A discharge pressure of the second ballast pump 134 is higher than that of the first ballast pump 4. That is because a pressure loss by the slit plate 135 should be compensated and moreover, other pressure losses should be considered. Specifically, one remodeling example with the second ballast pump 134 with a specification of 300 m$^3$/h, 1.35 MPa can obtain a favorable treatment result. A preferable range is 150 to 450 m$^3$/h, 0.5 to 2.0 MPa.

If the second ballast pump 134 has the same flow rate as that of the first ballast pump 4 and a high pressure, the pump becomes larger than the first ballast pump 4 and requires a large installation space. However, it is extremely difficult to ensure the installation space in a narrow ship. By setting the flow rate of the second ballast pump 134 lower than that of the first ballast pump 4, the size of the pump is minimized, and the installation spaces can be easily found.

In the present invention, the specification of the low flow-rate/high pressure of the second ballast pump 134 is not limited to the numeral values cited in the specific example but has a technical significance in comparison with the existing first ballast pump 4.

The slit plate 135 destroys the aquatic organisms in the ballast water by passing the ballast water in which ozone is mixed by the ozone mixing device 133 with a high pressure and moreover, by a shearing force.

Details of the slit plate 135 are shown in FIGS. 4 to 8.

Figure 4:
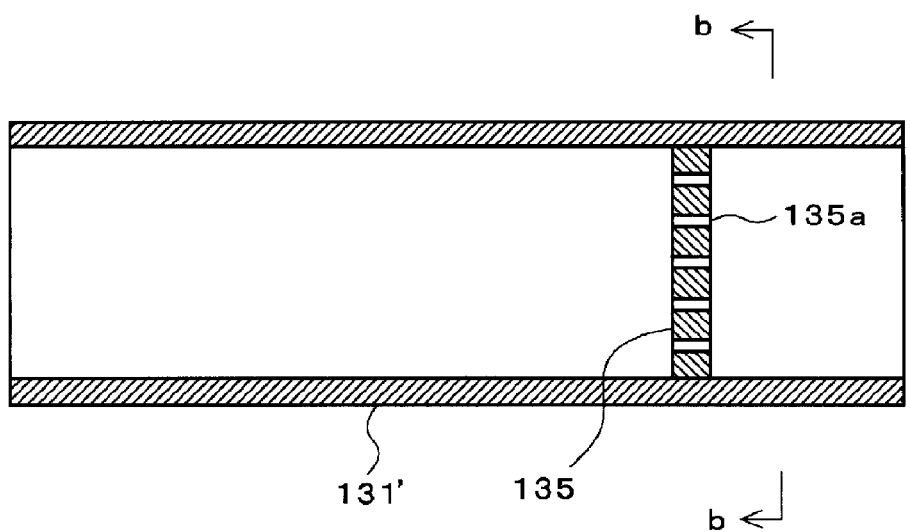
FIG. 4 is a sectional view illustrating a slit plate in a branch pipe.
Figure 5:
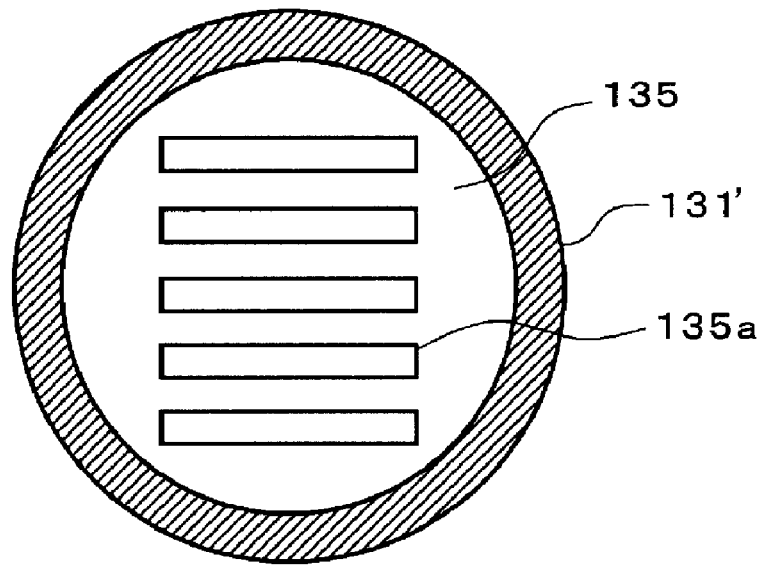
FIG. 5 is a sectional view of b-b line in FIG. 4.

FIG. 4 is a sectional view illustrating the slit plate 135 in the branch pipe 131', and FIG. 5 is a sectional view of b-b line in FIG. 4, and as shown in them, the slit plate 135 is disposed inside the branch pipe 131' so as to block the entire flow passage of the branch pipe 131'.

In the slit plate 135, a plurality of slit-shaped openings 135a are formed. An opening width of the opening 135a is set at a width that can sufficiently exert an effect to destroy the aquatic organisms in the ballast water by the shearing force, and it is preferably 200 to 500 μm.

The ballast water transferred through the branch pipe 131' is pressure-fed with a high pressure by the ballast pump 134 toward the slit plate 135. The pressure-fed ballast water tries to pass the slit-shaped openings 135a in the slit plate 135 in a turbulent flow state, and since a shearing phenomenon occurs in passage through the openings 135a, the aquatic organisms in the ballast water are destroyed and killed.

In order to exert the destructive killing effects by the shearing force more effectively, the slit plate 135 is preferably mounted in a direction orthogonal to a flow direction of the ballast water.

Also, though the slit plate 135 is mounted in close contact in the branch pipe 131', it is preferably installed on the branch pipe 131' by a flange and the like so that it can be easily removed for washing, though not shown.

The shape of the plurality of slit-shaped openings 135a formed in the slit plate 135 is preferably an elongated rectangle as exemplified in FIG. 5. The number of openings 135a is not particularly limited but is set as appropriate according to the pressure loss of the ballast water and occurrence situation of the shearing phenomenon.

Figure 6:
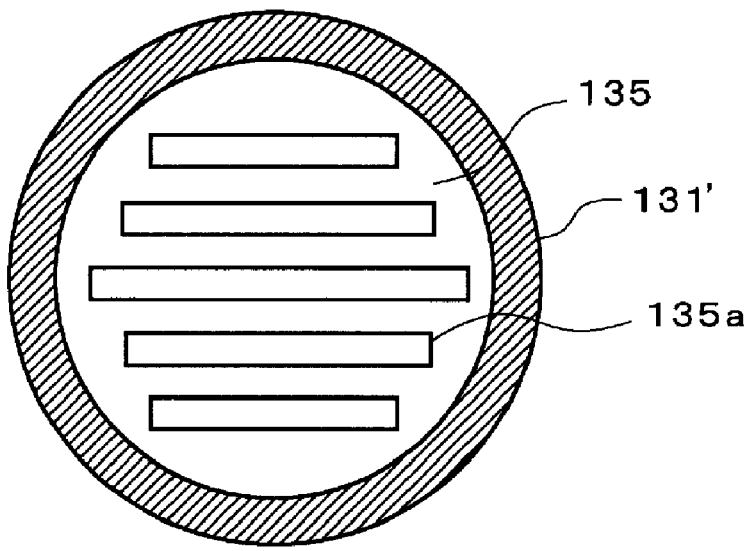
FIG. 6 is a sectional view illustrating another mode of an opening of the slit plate.

All the openings 135a may be formed in the same length as shown in FIG. 5, but as shown in FIG. 6, they may be formed in conformity to the sectional shape of the branch pipe 131' so that the opening 135a at the center part is formed longer and the openings becomes gradually shorter toward the end portions.

Figure 7:
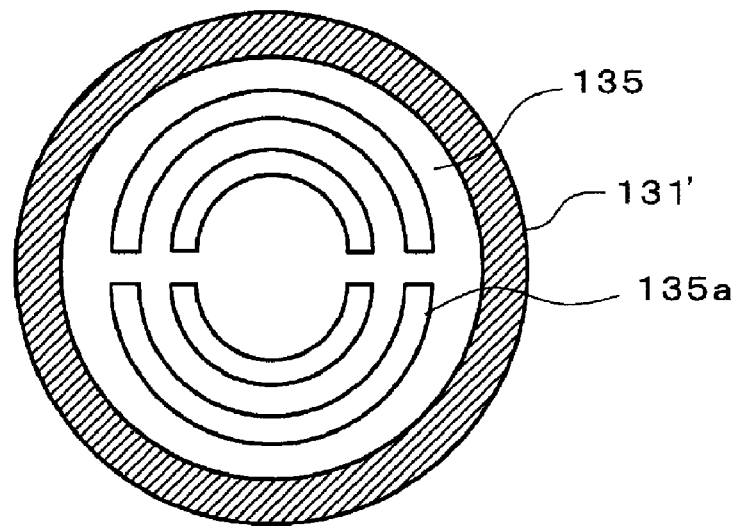
FIG. 7 is a sectional view illustrating still another mode of the opening of the slit plate.

Also, the shape of each opening 135a is not limited to a straight state but may be in a curved shape as shown in FIG. 7. FIG. 7 shows a mode of arrangement in an arc state as an example of the curved state.

Figure 8:
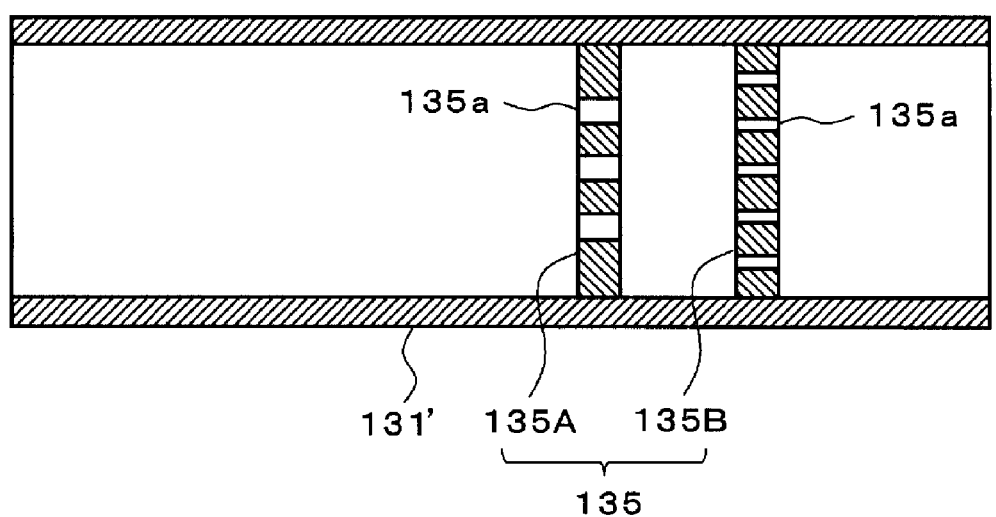
FIG. 8 is a sectional view illustrating another mode of the slit plate in the branch pipe.

Moreover, the number of slit plates 135 disposed in the branch pipe 131' is not limited to one but a plurality of plates may be disposed with an interval. FIG. 8 shows an example in which two slit plates 135A, 135B are disposed in the branch pipe 131. If the plurality of slit plates 135 are disposed in this way, it is preferable that the width, size, number, and shape of the openings 135a of each slit plate 135 are made different from each other. Thereby, the shearing phenomenon can be exerted more effectively, and the destructive killing effects of the aquatic organisms in the ballast water can be further improved.

As mentioned above, the aquatic organisms in the ballast water transferred through the branch pipe 131' are killed by ozone mixing in the ballast water by the ozone mixing device 133 and the shearing force by the slit plate 135.

The deaeration tank 136 deaerates and separates undissolved ozone from the ballast water having passed the slit plate 135. Thereby, transfer of the ballast water containing the undissolved ozone to the ballast tank 2 and the like is prevented, and corrosion of the ballast tank 2 and the like is avoided.

A gas containing the ozone separated from the ballast water by the deaeration tank 136 is discharged into the air from the deaeration tank 136. In this discharge line, a discharged ozone dissolving tower 137 is preferably provided so that the ozone in the discharge gas is dissolved by the discharged ozone dissolving tower 137 and then, discharged into the air from on the deck of the hull 1.

The ballast water from which the gas containing the undissolved ozone is deaerated and separated by the deaeration tank 136 is returned to the water discharge pipe 7 again.

Between two branch portions where the branch pipe 131' and the water discharge pipe 7 are connected, the opening/closing valve 13a is provided, and when the opening/closing valve 13a is closed, the ballast water taken in from the intake pipe 5 is made to flow into the branch pipe 131 side.

Also, the opening/closing valves 13b, 13c are provided in the vicinity of an inflow end and an outflow end of the branch pipe 131' so that the ballast water transferred from the intake pipes 5, 5' to the water discharge pipe 7 is to be flown into the treatment apparatus 13 or not is switched.

If the ballast water is to be treated by such a treatment apparatus 13, the opening/closing valves 12a, 12b, 12c, 12e, 12f, 12h, 13b, 13c are opened, while the opening/closing valves 12d, 12g, 12i, 13a are closed, respectively, and then, the ballast pump 4 is operated so as to take in the ballast water from the sea chest 3 through the intake pipe 5. The ballast water flowing into the intake pipe 5 from the sea chest 3 has large trash removed by the strainer 6 and then, flows into the branch pipe 131 form the water discharge pipe 7 and has foreign substances removed by the pre-filter unit 132 and then, mixed with ozone by the ozone mixing device 133 and discharged by the operation of the ballast pump 134 at a high pressure toward the slit plate 135 so that the aquatic organisms are destroyed and killed. After that, the ballast water from which the undissolved ozone is deaerated and separated by the deaeration tank 136 is returned to the water discharge pipe 7 again, and injected into each ballast tank 2 from the water injection/discharge nozzle 10 provided in each ballast tank 2 through the major piping 9.

As a result, in each ballast tank 2, the ballast water in which the aquatic organisms are killed is reserved. Since the treatment apparatus 13 can be installed only by connecting one end of the branch pipe 131 and one end of 131' to the water discharge pipe 7, respectively, and by installing the opening/closing valve 13a between the two branch portions, the apparatus can be easily attached to the existing ballast-water system piping.

The first ballast pump 4 is an existing pump, and it is only necessary that the pump has a required sufficient discharge pressure for transferring the ballast water taken in from the sea chest 3 to each ballast tank 2. The discharge pressure is smaller than that of the second ballast pump 134 disposed in the treatment apparatus 13 as mentioned above. The existing ballast-water system piping such as the water discharge pipe 7 and the major piping 9 and the like used for transferring the ballast water to each ballast tank 2 by the operation of the first ballast pump 4 is designed to have a maximum design pressure according to the discharge output of the first ballast pump 4.

On the other hand, since the second ballast pump 134 has a pressure higher than that of the first ballast pump 4, when the ballast water is treated by the treatment apparatus 13 by operating the second ballast pump 134, the high discharge pressure of the second ballast pump 134 is applied to the existing ballast-water system piping designed with a relatively low pressure according to the discharge pressure of the first ballast pump 4. Therefore, in the treatment apparatus 13, it is preferable that a return pipe 138 for returning the ballast water to the primary side of the ozone mixing device 133 for circulation is provided in the middle of the pipe for flowing the ballast water discharged from the deaeration tank 136 into the water discharge pipe 7 in the existing ballast-water system piping and a safety valve 13d is also provided in the return pipe 138, which is opened when a pressure larger than a predetermined pressure is applied in a line 131" on the secondary side (downstream side) of the slit plate 135.

As a result, if the pressure in the line on the secondary side (downstream side) of the slit plate 135 becomes higher than the maximum design pressure of the existing ballast-water system piping due to some reason during the operation of the second ballast pump 134, the safety valve 13d is opened so as to return a part of the ballast water discharged from the deaeration tank 136 to the primary side of the ozone mixing device 133 through the return pipe 138 for circulation, and the discharge pressure higher than the maximum design pressure can be prevented from being applied to the existing ballast-water system piping.

In addition, it is only necessary that the branch pipes 131', 131" of the treatment apparatus 13 have a high maximum design pressure according to the discharge pressure of the second ballast pump 134 only at least at a portion connecting the second ballast pump 134 and the slit plate 135, and it is not necessarily required that the overall maximum design pressure of the branch pipe 131 is increased according to the discharge pressure of the second ballast pump 134.

The safety valve 13d may be provided with a pressure sensor, not shown, for measuring a pressure of the ballast water on the secondary side of the slit plate 135, for example, so that a valve-opening operation is executed if the measured value becomes a predetermined value or more.

In the treatment apparatus 13, it is preferable that a removing device 139 for removing an oxidant containing bromine oxides in the ballast water by activated carbon is provided when the ballast water treated by the treatment apparatus 13 is discharged to the outside of the hull 1 from each of the water discharge ports 8, 8' of the water discharge pipe 7 from each ballast tank 2. By means of the removing device 139, the oxidizing substances such as harmful oxidant (bromine oxide, for example) contained in the treated ballast water can be removed.

In FIG. 1, two activated carbon tanks 139a, 139a are provided in parallel and they are installed in the piping 139b connected to the water discharge pipe 7. The piping 139b is provided so as to take in the ballast water from the water discharge pipe 7 and pass it through the activated carbon tanks 139a, 139a and then, return it to the water discharge pipe 7 again. Between the two connection portions of the piping 139b, the opening/closing valve 13e is provided, and by closing the opening/closing valve 13e, the ballast water transferred through the water discharge pipe 7 flows into the piping 139b side and is transferred to the removing device 139.

The number of the activated carbon tanks 139a provided in the removing device 139 is not limited to two at all. Also, it is more preferable that the removing devices 139 are disposed on each of the water discharge ports 8, 8 side sandwiching the connection portions with the water discharge pipe 7 and the major piping 9 so that the ballast water having been treated by the activated carbon can be discharged from each of the water discharge ports 8, 8', respectively.

In the embodiment described above, the ballast water after ozone mixing is transferred to the slit plate 135 by installing the ozone mixing device 133 in the branch pipe 131' between the pre-filter unit 132 and the ballast pump (second ballast pump) 134, but the ozone mixing device 133 may be installed on the secondary side (discharge side) of the slit plate 135 so that ozone is mixed in the ballast water having passed the slit plate 135.

The invention claimed is:

1. A treatment apparatus for ship ballast water comprising:
an opening/closing valve provided on an existing ballast-water system piping, the piping for taking in ballast water by a first ballast pump with high flow-rate/low pressure into a ship and transferring the water to a ballast tank,
a branch pipe branched from a primary side of said opening/closing valve for conducting the ballast water, taken in from said ballast water system piping, to a secondary side of said opening/closing valve on said ballast water system piping,
an ozone mixing device provided on said branch pipe for mixing ozone generated by an ozone generator in said ballast water,
a second ballast pump provided on the secondary side of said ozone mixing device on said branch pipe, said second ballast pump operable to discharge said ballast water with a lower flow-rate and higher pressure than said first ballast pump,
a slit plate provided on a secondary side of said second ballast pump on said branch pipe and having a plurality of slit-shaped openings for destroying aquatic organisms in the ballast water by a shearing force when said ballast water passes through said slit plate,
a deaeration tank provided on said branch pipe for deaerating undissolved ozone from the ballast water in which ozone was mixed by said ozone mixing device,
a pipe for flowing the ballast water discharged from said deaeration tank provided on said branch pipe into said ballast water system piping,
a return pipe provided from a middle of said pipe for flowing the ballast water discharged from said deaeration tank provided on said branch pipe into said ballast water system piping, the return pipe for returning the ballast water to a primary side of said ozone mixing device for circulation,
a pressure sensor for measuring pressure of the ballast water on the secondary side of said slit plate, and
a safety valve provided on said return pipe which is configured to open when the pressure of ballast water on the secondary side of said slit plate as measured by said pressure sensor reaches or exceeds a predetermined pressure,
wherein by closing said opening/closing valve, the entire amount of the ballast water taken into the ship by said first ballast pump is conducted into said branch pipe, the deaerated ballast water discharged from said deaeration tank is returned to said ballast-water system piping, and said safety valve being set to open when a pressure larger than a predetermined pressure is applied on said secondary side of said slit plate, so as to return a part of the ballast water in said branch pipe via said return pipe to said primary side of said ozone mixing device.

2. The treatment apparatus for ship ballast water according to claim 1, further comprising a discharged ozone dissolving tower for dissolving ozone separated from the ballast water by said deaeration tank and discharging to the air.

3. The treatment apparatus for ship ballast water according to claim 1, further comprising a discharge pipe in said ballast-water system piping for discharging the ballast water in said ballast tank, wherein a removing device having activated carbon for removing an oxidant containing brome oxide in the ballast water is provided in the discharge pipe.

4. The treatment apparatus for ship ballast water according to claim 2, further comprising a discharge pipe in said ballast-water system piping for discharging the ballast water in said ballast tank, wherein a removing device having activated carbon for removing an oxidant containing bromine oxide in the ballast water is provided in the discharge pipe.

* * * * *